United States Patent [19]
Spragg et al.

[11] 3,866,057
[45] Feb. 11, 1975

[54] METHOD AND APPARATUS FOR MEASURING GAS FLOW

[75] Inventors: Walter Thomas Spragg, Sutherland, New South Wales; Brian William Seatonberry, Sans Souci, New South Wales, both of Australia

[73] Assignee: Australian Atomic Energy Commission, New South Wales, Australia

[22] Filed: Mar. 22, 1973

[21] Appl. No.: 344,034

[30] Foreign Application Priority Data
Mar. 24, 1972 Australia.............................. 8410/72

[52] U.S. Cl................................. 250/303, 250/356
[51] Int. Cl. ............................................ G21h 5/00
[58] Field of Search............................. 250/303, 356

[56] References Cited
OTHER PUBLICATIONS
D. E. Hull, "Using Braces in Refinery Control," Nucleonics, April 1955, Vol. 13, No. 4, pp. 18–21.

Primary Examiner—James W. Lawrence
Assistant Examiner—Davis L. Willis
Attorney, Agent, or Firm—Waters, Roditi, Schwartz & Nissen

[57] ABSTRACT

The present invention is an apparatus and method for the absolute measurement of the mass flow rate of a gas by injecting a radioactive tracer isotope, with a known activity relative to a standard volume, into the flowing gas and measuring the activity when a small sample representative of the flowing gas is removed at a sampling point downstream of the injection point at a sufficient distance to ensure a homogeneous mixture of the tracer isotope with the flowing gas. The measured activity may then be used to determine the mass flow rate of the gas.

14 Claims, 9 Drawing Figures

METHOD AND APPARATUS FOR MEASURING GAS FLOW

The present invention relates to the absolute measurement of the mass flow rate of a gas in a pipe or duct, which is an important requirement in commerce, particularly in the petroleum, chemical and natural gas industries.

It is well known that processes for gauging the quantity of flowing fluids can be separated into five main types; (1) using meters that measure the velocity of the fluid directly; (2) using meters that measure the fluid flow by recording the pressure drop when the flow is constricted; (3) using meters that measure the flow by observing the area required for a given flow to take place; (4) using meters that are suitable only for open streams; and (5) using tracer methods.

Metering processes require a knowledge of the pipe diameter and the resistance to flow, which often cannot be predicted in practice. For instance, with a town gas reticulation system, deposits on the wall of the pipe reduce the internal diameter of the pipe and alter the frictional resistance to gas flow. Further sources of error in all metering devices arise from temperature and pressure changes. A temperature change of 1° C. can cause an error of 0.33 per cent and when pipelines are exposed to the elements, a simultaneous measurement of temperature is necessary to enable a meaningful estimation of the quantity of flowing gas.

Methods for the volume measurement of gas flow using a radioactive trace material introduced into the flowing gas are practised by (i) continuous injection and continuous monitoring, (ii) a pulse technique followed by total count and (iii) a pulse technique followed by a collection of a total sample. Each of the processes (i) to (iii) will be familiar to those skilled in the art.

The present invention is an apparatus and method for the absolute measurement of the mass flow rate of a gas by injecting a radioactive tracer isotope with a known activity relative to a standard volume, into the flowing gas and measuring the activity when a small sample representative of the flowing gas is removed at a sampling point downstream of the injection point at a sufficient distance to ensure a homogeneous mixture of the tracer isotope with the flowing gas. The measured activity may then be used to determine the mass flow rate of the gas.

According to the present invention the technique developed to measure gas flow rates in pipelines relies on a measurement of the time taken by a "tagged" volume of gas to pass a given point, the magnitude of the tagged volume being determined by first injecting a concentrated charge of radioactive gas into it, and then measuring the extent to which the charge is diluted. The main flow of gas may be left relatively undisturbed, with the dilution being determined from a small sample taken so that it is representative of the main gas flow at every instant in terms of the concentration of tracer. When this sample is mixed, the concentration of tracer will be the same as if the whole tagged volume itself had been diverted from the gas flow and allowed to mix to a uniform concentration of tracer.

A cartridge having a fixed-volume chamber is filled (at known temperature and pressure) with radioactive gas and discharged into a large drum which may be air filled and the volume of which is known accurately. The contents of the drum are mixed to uniformity, and a small sample of the resultant gas mixture is used to fill a further fixed and known volume forming the sample chamber of a gas radioactivity detector. The number of counts registered per unit time is then a function of the activity of the gas, which was loaded into the cartridge, when diluted to a known volume. To determine the magnitude of an unknown gas-filled volume, the cartridge is refilled with the radioactive gas which is then discharged into the unknown gas-filled volume, a sample of the gas mixture is taken and placed in the sample chamber of the detector, and the count rate noted. If the known and unknown volumes of the diluted gas mixtures are the same, the count rates of the respective samples will be the same; if the volumes are different, the count rates will be inversely proportional to the volumes. The cartridge need not always be refilled at the same temperature and pressure, provided that the actual values of temperature and pressure are known, or can be computed. Further, it is preferable to have different pressures where vastly different known and unknown volumes are being compared, so that the concentrations of activity in the samples may be kept roughly to the same order. Similarly, the temperature and pressure conditions in the detector chamber may be altered, provided that these conditions are known and acounted for when computing the final result. Different cartridges can be interchanged if their storage chambers have identical volumes to within the experimental error of the whole technique.

The apparatus consists of a gas tight rechargeable cartridge, having a fixed volume chamber for storing a charge of radioactive gas in a reproducible volume, designed and operating to ensure that all the radioactive tracer is discharged into the flowing gas in a pulse of short duration; a means for extracting the representative sample of gas at a constant flow rate, and means for recording the time taken to extract the representative sample, a radioactivity detector having a fixed volume sample chamber and a radiation sensor for measuring the activity of gas sampled relative to the activity of the gas before injection, wherein the detector and cartridge have a known relation in terms of a calibrating count rate registered by the detector when the fixed volume sample chamber is filled with gas derived from dilution of the tracer from the rechargeable cartridge into a vessel of known volume whereby the mass flow rate of the gas in the pipe or duct may be determined by comparing the count rate registered by the detector when the sample chamber is filled with gas from the representative sample with the calibrating count rate.

The invention in one general form is a method of determining the mass flow rate of gas in a pipeline or duct comprising the steps of injecting into the pipeline at an upstream point a first charge of radioactive tracer, extracting for a period of time a sample of the gas from the pipeline at a substantially constant flow rate, the extraction being at a point sufficiently far downstream that the tracer is distributed substantially homogeneously over the cross-section of the pipe, said period substantially covering the time taken for the tracer to pass the downstream point recording said period, mixing said sample to a uniform concentration of tracer, placing at least part of said mixed sample in a fixed volume radioactivity detector and determining a count rate corresponding thereto whereby the mass of gas in the pipeline passing the point of complete mixing of the tracer during the recorded time period may be determined by comparing the said count rate with a standard count rate obtained by placing in said detector a standard sample obtained from the dilution of a second charge of radioactive tracer, the total activity of which has a known relation to that of said first charge, in a known standard volume.

The invention in another general form is an apparatus for determining the mass flow rate of a gas in a pipeline or duct comprising a cartridge having a fixed volume chamber for storing a charge of radioactive tracer material and operable to rapidly discharge substantially all the tracer into the pipeline, means for extracting a representative sample of the gas at a substantially constant flow-rate from the pipeline, timing means for recording the period over which the representative sample is extracted, and a radioactivity detector having a fixed volume sample chamber and a radiation sensor for indicating the activity of gas in the sample chamber, wherein the detector and cartridge have a known relation in terms of a calibrating count rate registered by the detector when the sample chamber is filled with gas derived from the dilution of a charge of tracer from the cartridge into a vessel of known volume, the vessel's volume being large compared with the volume of the cartridge gas storage chamber, whereby the mass flow rate of the gas in the pipeline may be determined by comparing the count rate registered by the detector when the sample chamber is filled with gas from the representative sample with the calibrating count rate.

The features of construction, combination of the elements and arrangements of parts of a preferred apparatus according to the invention are described by way of example with reference to the drawings, wherein.

Figure 1:
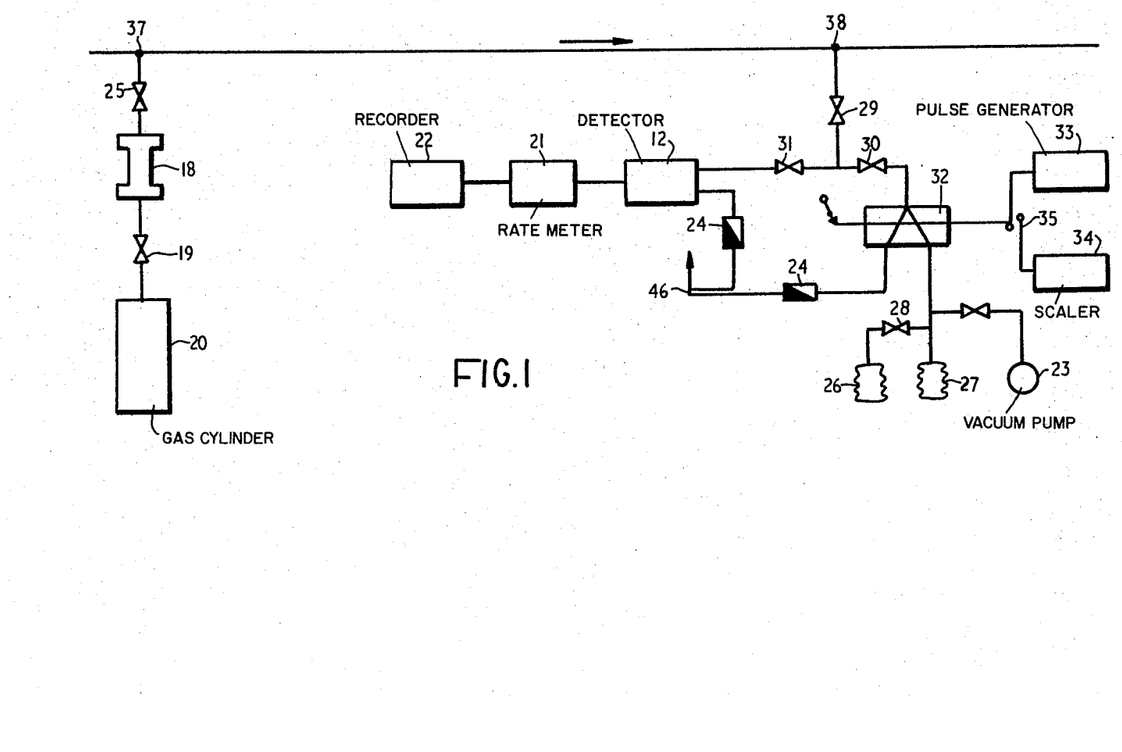
FIG. 1 is a flow diagram of an injection and sampling system according to the invention, showing the interconnection of parts of the apparatus.
Figure 2:
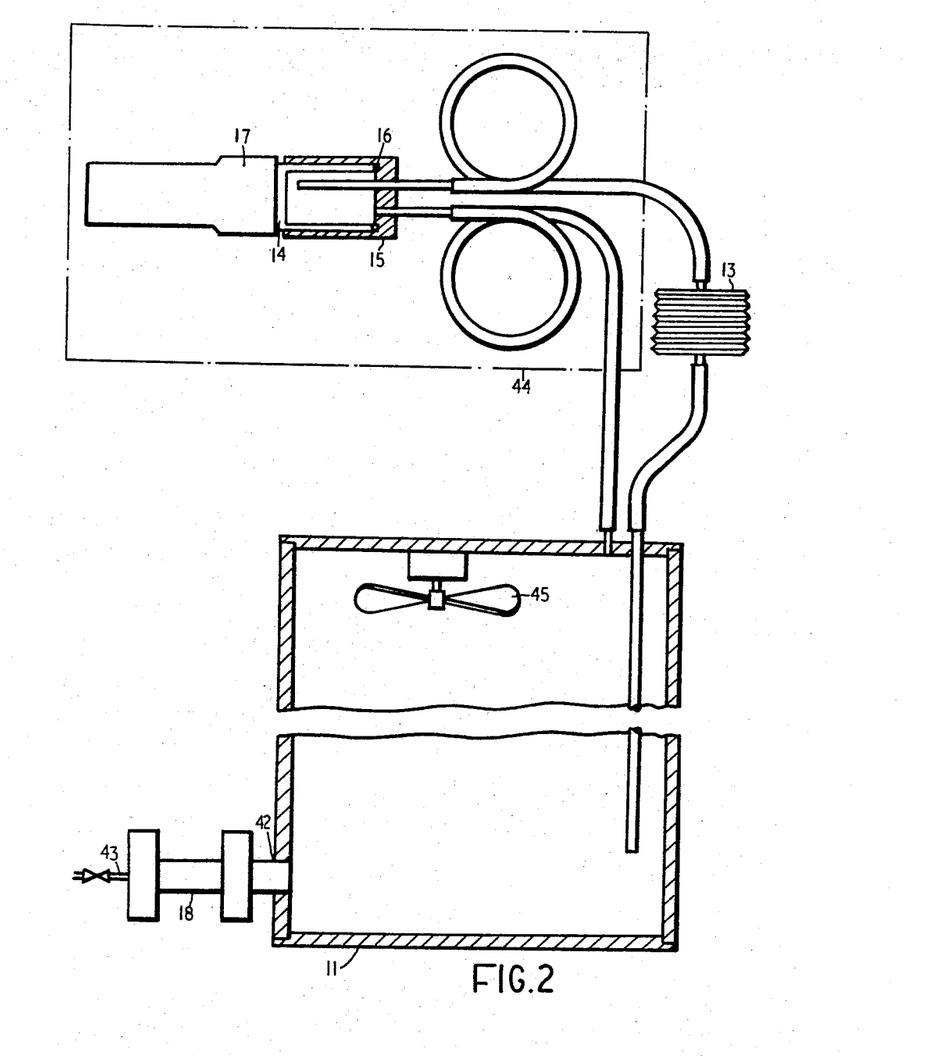
FIG. 2 is a schematic diagram illustrating an injector, a calibration vessel, a detector according to the invention and the interconnection thereof.

The flow diagram, as illustrated in FIG. 1, shows the apparatus required, according to the invention, for the measurement of gas flow in a duct or pipe, the direction of flow being as indicated. The major components, forming the apparatus, are an injector 18, a gas cylinder 20, detector 12, rate meter 21, recorder 22, sampling valve 32, pulse generator 33, scaler 34, flexible sample bags 26 and 27, flow meter 24, and vacuum pump 23. Further the apparatus required to determine the activity of a radioactive tracer gas consists, as illustrated in FIG. 2, of an injector 18, a known volume drum 11, a detector 12 and a pump 13.

Figure 3A:
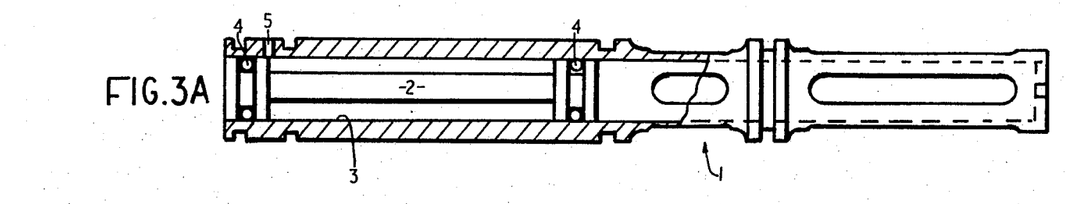
FIG. 3 shows three views, A, B and C, of the injector cartridge, which is part sectioned to illustrate a piston in a first, a second and a third position respectively.
Figure 3B:
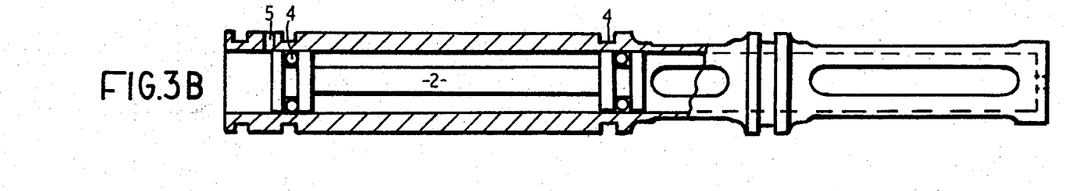
Figure 3C:
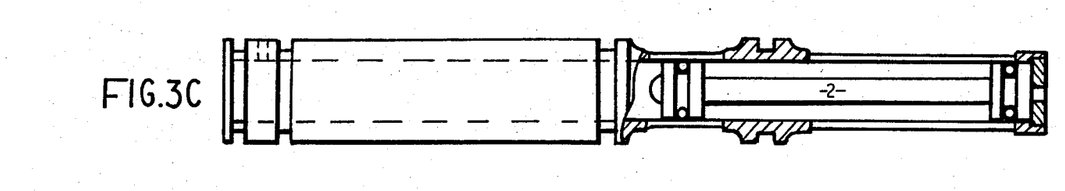
Figures 4, 5:
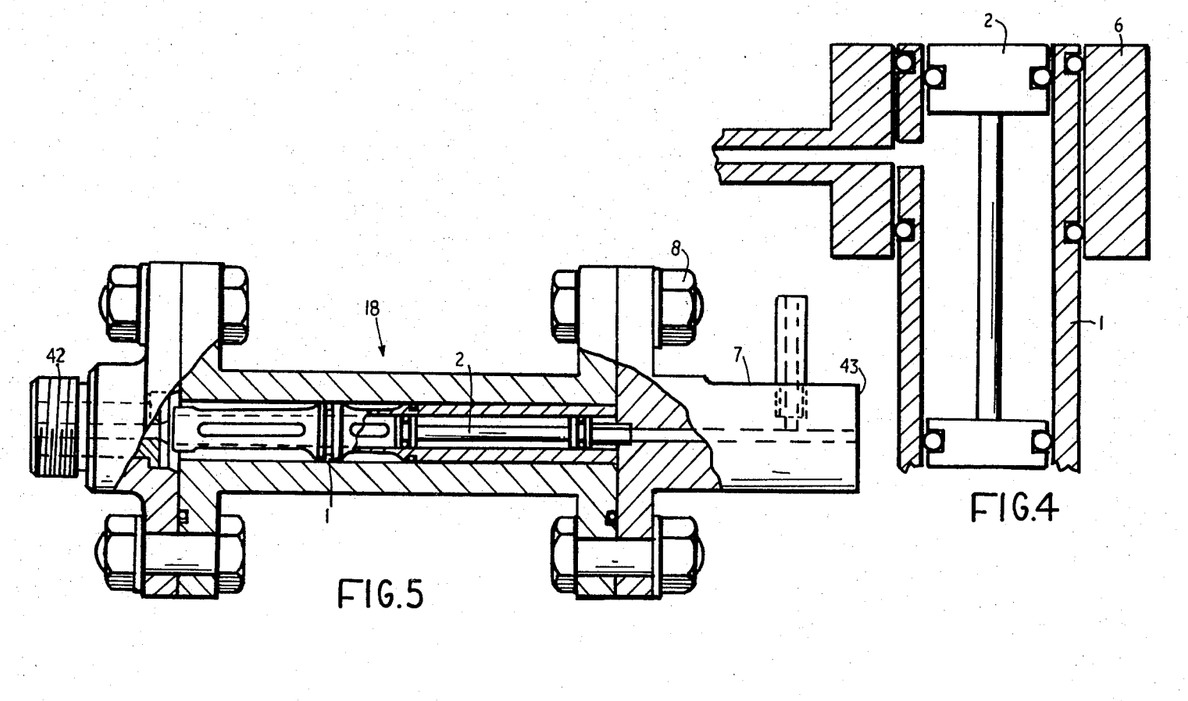
FIG. 4 is a diagrammatic view of a cartridge loading rig according to the invention.
FIG. 5 shows a pressure vessel according to the invention, part sectioned to illustrate a loaded injector cartridge located therein.
Figure 6:
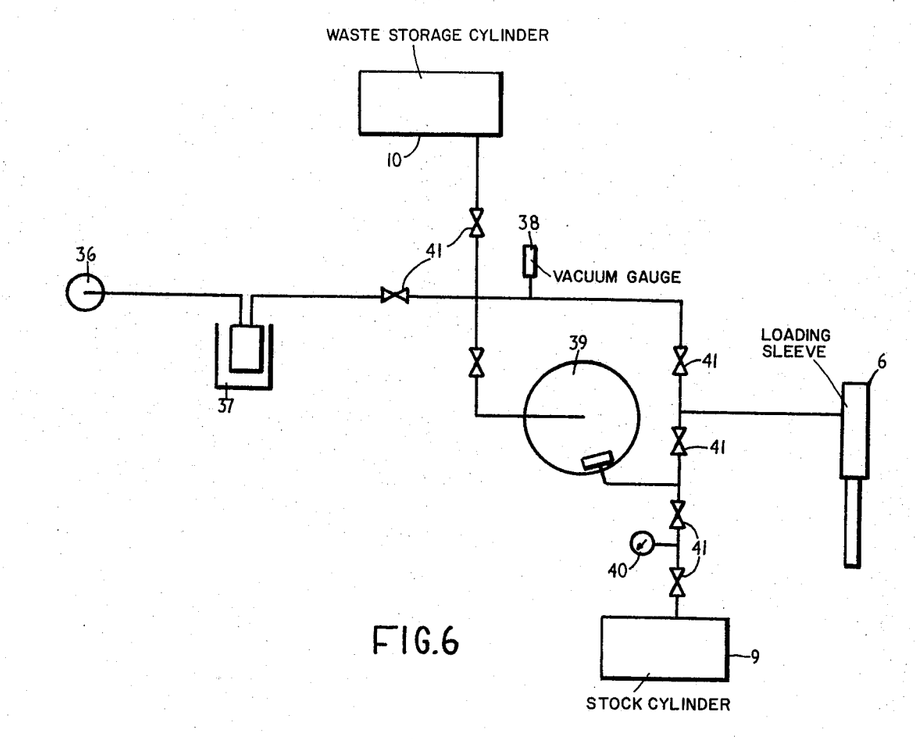
FIG. 6 is a flow diagram of an isotope sample loading system.

FIG. 3 shows the rechargeable injection cartridge 1. The piston 2 is a gas tight sliding fit within the honed and polished cartridge bore 3. The "O" ring seatings 4 are reduced in size from British Standard Specification to be a neat fit, thus ensuring a fixed internal volume. The cartridge is loaded with radioactive gas, say krypton–85, by first locating the piston flush with the open end of the cartridge, (FIG. 3A). Krypton–85 can then be introduced into the piston space through a hole 5 using a brass loading sleeve or collar 6, which may be slipped over the end of the injection cartridge as shown in FIG. 4. The loading collar is supplied with gas from a stock cylinder 9 of Kr–85 connected to a vacuum rig as shown in FIG. 6. The vacuum rig, as illustrated in FIG. 6, also includes a vacuum pump 36, a cold trap 37, a pirani or high vacuum pressure gauge 38, differential pressure gauge 39, a pressure gauge 40 for indicating gas pressure in the stock cylinder 9, a waste storage cylinder 10 and valves 41. The total volume of the components of the vacuum rig including the pressure gauges and pump connections, is reduced to a minimum conveniently possible. To minimise loss of stock krypton–85, waste gas is transferred to the waste storage cylinder 10.

When the injection cartridge is loaded, the piston is moved to the second position shown in FIG. 3B, which seals the gas between the two "O" rings. The loaded cartridge is now mounted as in FIG. 5, inside a pressure vessel 18 of wall thickness appropriate to the pressures in use. The top flange 7 of the pressure vessel is then secured with high tensile steel bolts 8. It should be noted that the loaded cartridge can be transported or stored for several days as convenient.

The apparatus is calibrated in terms of absolute units of measurement. One end 42 of the pressure vessel 18 is coupled to a calibrated volume drum 11 as in FIG. 2 and the other end 43 to a gas cylinder charged to 3.5 kg/cm$^2$ through a quick release valve. A detector 12 and a small recirculating pump 13 are also connected to a vessel or drum 11. The volume of the drum, detector, pump and fittings is accurately measured by methods which will be familiar to those skilled in the art, with the volume of the detector, pump and fittings being added to the calibration volume. The detector 12 of the beta radiation, according to the present invention, is provided with a plastic phosphor cup 14. Detectors of 200–500 ml capacity using 10 cm long cups of 0.25 cm wall thickness have been used in the examples which are given later. The detector is mounted in an aluminium cup 15 provided with inlet and outlet connections to air, the open end of the plastic cup 14 being sealed to the aluminium cup base by an "O" ring 16. The base of the detector plastic cup 14 is mounted against the window of a photomultiplier tube 17. The assembly consisting of the aluminium cup, plastic cup, detector and photomultiplier tube is then spring loaded into a sealed light-proof box 44 which is provided with anti-vibration supports. Electrical and gas flow connections are mounted externally to the box.

With the detector, recirculating pump and pressure vessel containing the injection cartridge loaded with krypton–85 at a known pressure and temperature linked to the drum, the fan 45 in the drum is started and the krypton–85 charge fired into the drum by activating the quick release valve and closing it after 1 to 2 seconds. The mixed gas in the drum is re-cycled through the detector until complete mixing is assured and the count rate determined. After correcting the applied pressure to a standard temperature and correcting for the dead time of the counter, the count rate is expressed as counts per second at the same standard pressure of the standard drum.

To measure the quantity of gas flowing in a pipe or duct (FIG. 1), two access points 37, 38 to a pipe, or duct, through which the mass flow is to be determined, are required at a sufficient distance apart to ensure adequate mixing. The pressure vessel 18 containing a loaded cartridge is connected through flexible pressure tubing and couplings to the upstream access point 37. Before coupling to the pipe or duct, polythene sleeving is threaded over the main gate valve 25 and the coupling area and secured to form relatively gas-tight seals separately over both the gate valve and the coupling. This has the advantage that monitoring of the seals can be used to detect any leak of radioactive gas during its injection. The other end of the pressure vessel is coupled through a quick release valve 19 to a high pressure cylinder 20, which has been charged to twice the gas mains pressure, but no less than 3.5 kg cm$^{-2}$ with air or nitrogen.

At the sampling point 38, ratemeters 21 and recorders 22 are connected as shown in FIG. 1. The sampling bags 26 and 27 are 0.125 mm thick polyvinyl chloride and are welded to polyvinyl chloride tubing. Two bags are used to permit thorough mixing of the total sampling before removal to the counting area. A vacuum pump 23 is used to remove air from the sampling bags before sampling commences.

Figure 7:
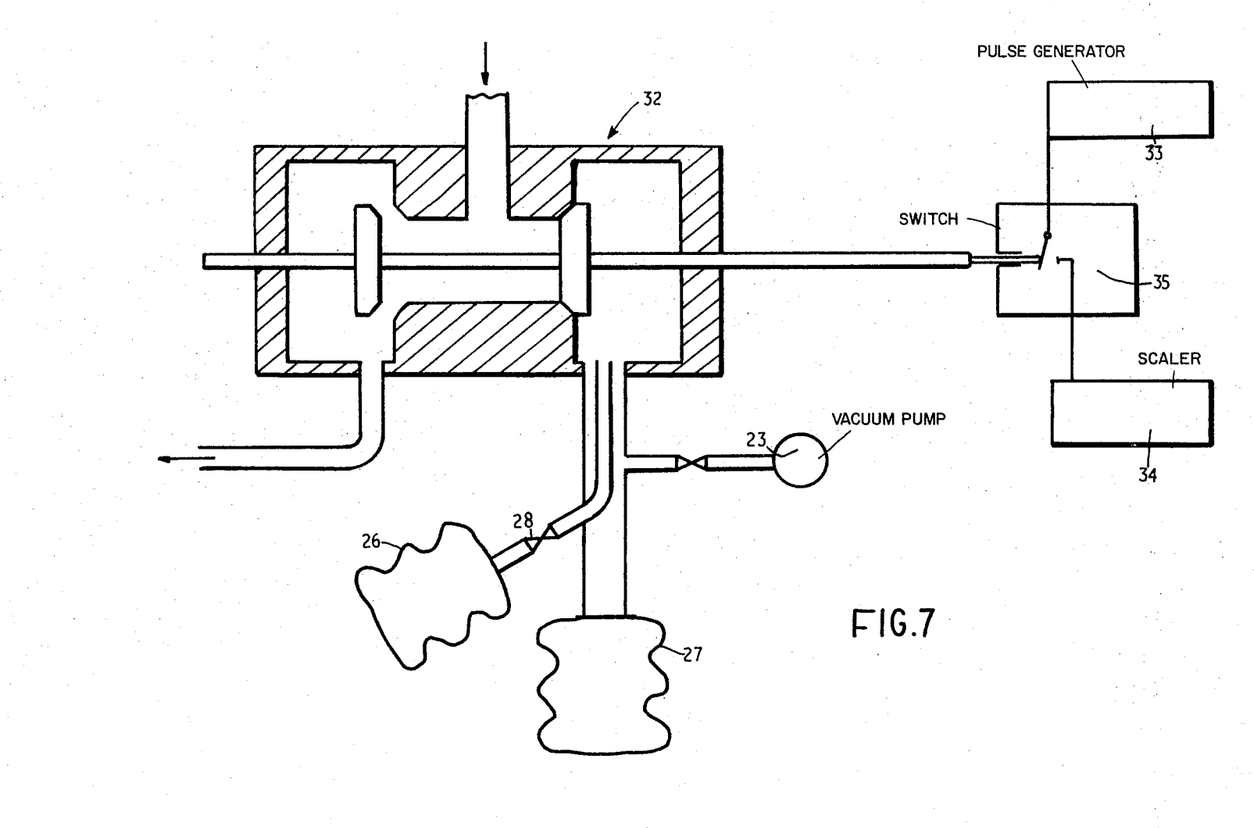
FIG. 7 is a diagrammatic view of a sampling valve and timing switch.

The gas main's valve 29 is opened and the leak rate adjusted at valves 30 and 31 with a small flow meter 24 to ensure a similar leak rate through both detector 12 and sampling valve 32. It should be noted that the detector may also be located, in series, in the sampling line between valves 29 and 30. The cartridge charge is then fired simultaneously with marking the recorder 22 and the velocity of flow to the detector and the pulse shape are checked. Using a monitor, the possibility of leakage into the polythene sleeving surrounding the injection coupling and valve 25 is checked. If no activity is detected and after ensuring that the sampling bags 26 and 27 are evacuated, the first measurement injection is made. Some 2 to 3 seconds before the pulse is due to arrive at the sampling point, the gas flow is diverted from vent 46 to sampling bags using the sampling valve 32 (FIG. 7) and sampling continued until a few seconds after the recorder has returned to background level. The sampling time is recorded using a pulse generator 33 feeding 1 kHz signals to a scaler 34 via switch 35. The gas in the sampling bags is now transferred to one bag 26, and the sample sealed at valve 28. The sealed bag is then removed and set aside for counting in the laboratory, the removed bag being replaced by a fresh sampling bag. The bags 26 are portable and the samples which are collected therein, may be stored safely for days if required. Any number of repeat observations may now be made using further cartridges loaded in the laboratory.

The mass flow rate in kilograms per second is $Q = \rho_p V_p$ where $\rho_p$ is the density of the flowing gas and $V_p$ is the volume of gas in cubic meters per second passing any section of the pipe. Provided the time of sampling of the gas includes the period during which the gas which has been homogeneously mixed with radioactive gas of activity $A$, passes the sampling point, the mass flow rate on the pipe is:

$$Q = A/\Delta A \cdot \rho_s V_s/t \quad (1)$$

where $\rho_s$ and $V_s$ are the density and volume of the sample at a specified temperature and pressure, $t$ is the period of time during which the sample was extracted, and $\Delta A$ is the activity of the sample.

The activity of the stock radioactive gas is calibrated in terms of the mass of gas contained by the vessel of known calibrated volume by injecting the contents of a cartridge of constant volume filed to a known pressure. The total activity in the rechargeable cartridge is proportional to the filling pressure as demonstrated by the results in Table I for repetitive injection of the contents of the rechargeable cartridge into a calibrated volume under temperature conditions.

TABLE I

| Calibration of Stock Krypton-85 | |
|---|---|
| Pressure loaded in cm | cps/cm at s.t.p. |
| 12.71 | 66.25 |
| 18.28 | 66.40 |
| 21.98 | 66.40 |
| 27.45 | 66.50 |
| 30.81 | 66.41 |
| 39.97 | 66.45 |
| Mean = 66.40 | |

Error $\sigma = 0.077$ or 0.116 per cent.

The count rate $C$ for the gas in the calibrated volume $V$ comprising the calibration vessel, connecting tubing, and the fixed volume, $v$, of the sample chamber of the radioactivity detector is $$C = A \Sigma (v/V) \quad (2)$$

where $\Sigma$ is the average efficiency of detection of radiation emitted by the radioactive gas in the fixed volume and $A$ is the activity of the mass of gas contained in the rechargeable cartridge.

The count rate $C_s$ for the gas sampled from the pipe line after homogeneous mixing is $$C_s = \Delta A \Sigma(v/V_s) \quad (3)$$

Hence from (1), (2) and (3) the mass flow rate is $$Q = (C/C_s)(\rho_s V/t) \quad (4)$$

and the volume flow rate is $$V_p = (C/C_s)(\rho_s/\rho_p)(V/t)$$

The mass flow rate given by equation (4) is an absolute method being a function only of volume, sampling time and the density of the sampled gas at the temperature and pressure obtaining while it is actually being measured. It is independent of the density of gas in the pipeline at the time of sampling and hence its temperature and pressure.

Use of the apparatus improves on the prior art British Pat. No. 1,195,229 (1970) British Pat. No. 1,186,921 (1970), Canadian Pat. No. 842,963 (1970), British Pat. No. 1,140,032 (1969). Canadian Pat. No. 747,483 (1966), U.S. Pat. No. 3,093,739, British Pat. No.

909,013 (1962), U.S. Pat. No. 2,714,168 (1955), Canadian Pat. No. 575,693 (1955), U.S. Pat. No. 2,627,543 (1953), U.S. Pat. No. 2,611,268 (1952), U.S. Pat. No. 1,808,709 (1931), by providing an absolute measure of mass gas flow rate which is independent of pressure and temperature changes in the pipe or duct, of the diameter of pipe or duct and of surface friction caused by roughness of the pipe or duct, and of whether the gas flowing in the pipe obeys laws for an ideal gas.

Absolute methods for the measurement of gas flow have been described by G. V. Evans, R. Spackman and J. C. G. Gardiner ("A Primary Standard of Gas Flow Measurement," AERE–R6011 1969, H.M.S.O., U.K.) and by E. W. Voice, E. B. Bell and P. K. Gledhill ("Radioactive Determination of Gas Flow in Large Ducts," *J. Iron and Steel Institute*, p.423–427, Aug. 1954).

The present invention overcomes previous disadvantages by making the test measurements relative rather than absolute, re-using fixed volume injection cartridges which have been calibrated relative to a fixed volume detector, and the cartridge/detector combination as a whole being in turn calibrated against a standard volume. The quantity of radioactivity required typically 0.1 microcurie of krypton-85 per 141.5 $M^3$ per hour of gas flow per second of sampling time is much less than the quantity required for applying the radioactive tracer techniques (i), (ii) and (iii) (referred to in page 2 of this specification), which means that the apparatus can be operated industrially using quantities of radioactivity which will not be hazardous to the general public or contribute significantly to environmental pollution.

The use of the apparatus is for the measurement of gas flow in a pipeline at a pressure of 2.067 k Pa is exemplified by the results in Table II in which the flow rates determined were compared in situ with the flow rates recorded by a meter especially calibrated to an accuracy of 0.2 per cent. Table III compares the meter readings for flowing ethylene gas with measurements made using the preferred apparatus.

In some applications it may be desirable merely to fill the cartridge with radioactive gas under reproductible conditions, making it unnecessary to know the actual temperature or pressure at which it is filled.

TABLE II

| Flow Measurements $m^3\ hr^{-1}$ | | | |
| --- | --- | --- | --- |
| For Air — 2.067 kPa | | | |
| Metered Flow | Mean | Measured Flow | Mean |
| 149.0 – 149.5 | 149.25 | 149.5 | 149.3 |
| | | 148.5 | |
| | | 150.4 | |
| | | 148.8 | |
| 95.71 – 96.29 | 96.00 | 96.84 | 96.01 |
| | | 95.85 | |
| | | 95.71 | |
| | | 95.65 | |
| 86.93 | 86.93 | 87.19 | |
| | | 87.05 | |
| | | 86.79 | |
| | | 86.90 | |

Single Observations

| Metered Flow | Measured Flow |
| --- | --- |
| 68.81 | 69.04 |
| 66.83 | 67.11 |
| 62.81 | 63.15 |
| 62.86 | 63.20 |
| 66.83 | 67.11 |

TABLE III

Comparison of Integrating Flow Meter Against Absolute Method
Ethylene Gas at 3.1 MPa

| | Meter Readings in kg/hr. | | Absolute Measurement in kg/hr. | |
| --- | --- | --- | --- | --- |
| 1. | 3037 | | 3063 | |
| 2. | 3112 | Mean 3079 | 3103 | Mean 3093 |
| 3. | 3089 | | 3125 | |
| 4. | 3076 | | 3076 | |
| 5. | 2909 | | 2923 | |
| 6. | 2908 | Mean 2907 | 2863 | Mean 2897 |
| 7. | 2895 | | 2841 | |
| 8. | 2917 | | 2961 | |

What we claim is:

1. A method of determining the mass flow rate of gas in a pipeline or duct comprising the steps of injecting into the pipeline at an upstream point a first charge of radioactive tracer, extracting for a period of time a sample of the gas from the pipeline at a substantially constant flow rate, the extraction being at a point sufficiently far downstream that the tracer is distributed substantially homogeneously over the cross-section of the pipe, said period substantially covering the time taken for the tracer to pass the downstream point, recording said period, mixing said sample to a uniform concentration of tracer, placing at least part of said mixed sample in a fixed volume radioactivity detector and determining a count rate corresponding thereto whereby the mass of gas in the pipeline passing the point of complete mixing of the tracer during the recorded time period may be determined by comparing the said count rate with a standard count rate obtained by placing in said detector a standard sample obtained from the dilution of a second charge of radioactive tracer, the total activity of which has a known relation to that of said first charge, in a known standard volume.

2. Apparatus for determining the mass flow rate of a gas in a pipeline or duct comprising a cartridge having a fixed volume chamber for storing a charge of radioactive tracer material and operable to rapidly discharge substantially all the tracer into the pipeline, means for extracting a representative sample of the gas at a substantially constant flow-rate from the pipeline, timing means for recording the period over which the representative sample is extracted, and a radioactivity detector having a fixed volume sample chamber and a radiation sensor for indicating the activity of gas in the sample chamber, wherein the detector and cartridge have a known relation in terms of a calibrating count rate registered by the detector when the sample chamber is filled with gas derived from the dilution of a charge of tracer from the cartridge into a large vessel of known volume, whereby the mass flow rate of gas in the pipeline may be determined by comparing the count rate registered by the detector when the sample chamber is filled with gas from the representative sample with the calibrating count rate.

3. An apparatus according to claim 2 wherein the cartridge is rechargeable.

4. Apparatus as defined in claim 3 wherein said cartridge is connected to a source of compressed gas to drive the charge of radioactive gas into said pipeline.

5. Apparatus as defined in claim 2 wherein said cartridge is formed with a bore which receives a piston in sliding engagement within said bore, said piston being sized and shaped such that upon insertion within said bore, it defines said fixed volume chamber, and including means for sealing said chamber, means for connecting said chamber to a supply of gas, means permitting said chamber to be filled with the gas, and means permitting discharge of the gas from said chamber.

6. Apparatus as defined in claim 5 wherein said cartridge engages with substantial fit within a loading collar, said collar and cartridge having an aperture, the aperture in the collar being connected to a supply of radioactive tracer gas and the cartridge aperture being open to said fixed volume chamber when the piston is in a first position, whereby on insertion of said cartridge in said collar the two apertures are aligned and permit the chamber to be loaded with a pressurized charge of tracer gas.

7. Apparatus as claimed in claim 6 wherein the cartridge loading aperture is isolated from the chamber, when the piston is displaced to a second position within the bore.

8. An apparatus as claimed in claim 5 wherein said discharge means includes a pressure vessel for receiving said cartridge therein, said pressure vessel having a discharge outlet at one end and an energy source at another end and a second aperture communicating with the bore of said cartridge whereby, when the piston is displaced by the energy source to a third position such that said chamber is open to said second aperture, discharge of the chamber gas occurs through said second aperture.

9. Apparatus as claimed in claim 8 wherein said energy source is a compressed gas.

10. Apparatus as claimed in claim 6 wherein said discharge means includes a pressure vessel for receiving said cartridge therein, said pressure vessel having a discharge outlet at one end and an energy source at another end and a second aperture communicating with the bore of said cartridge whereby, when the piston is displaced by said energy source to a third position such that said chamber is open to said second aperture, discharge of the chamber gas occurs through said second aperture.

11. Apparatus as claimed in claim 10 wherein said energy source is a compressed gas.

12. Apparatus as claimed in claim 7 wherein said discharge means includes a pressure vessel for receiving said cartridge therein, said pressure vessel having a discharge outlet at one end and an energy source at another end and a second aperture communicating with the bore of said cartridge whereby, when the piston is displaced by said energy source to a third position such that said chamber is open to said second aperture, discharge of the chamber gas occurs through said second aperture.

13. Apparatus as claimed in claim 12 wherein said energy source is a compressed gas.

14. Apparatus as claimed in claim 2 wherein said radioactivity detector has a plastics phosphor cup with a base and at least one side wall, the plastics cup being inserted in a sealing manner within a metal cup to define an enclosure having an inlet and an outlet, the base of the plastics cup being mounted against a window of a photomultiplier tube thereby permitting the activity of a gas within the enclosure to be measured.

* * * * *